G. H. WHEARY.
AUTOMOBILE TRUNK HOLDER.
APPLICATION FILED NOV. 11, 1916.
1,374,618.  
Patented Apr. 12, 1921.  
3 SHEETS—SHEET 1.
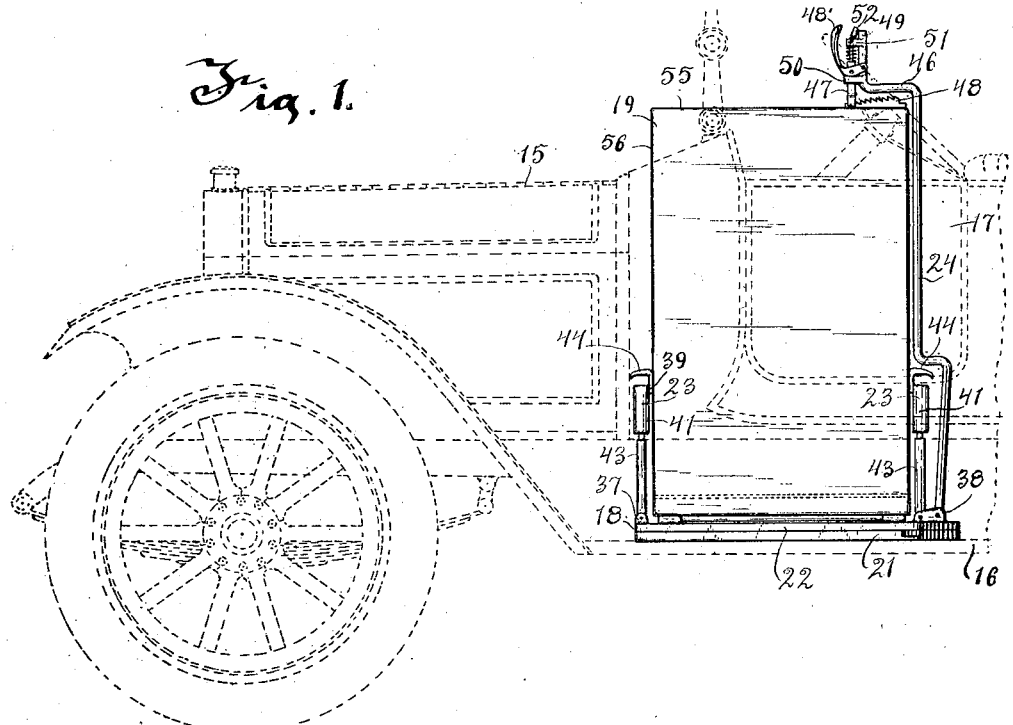
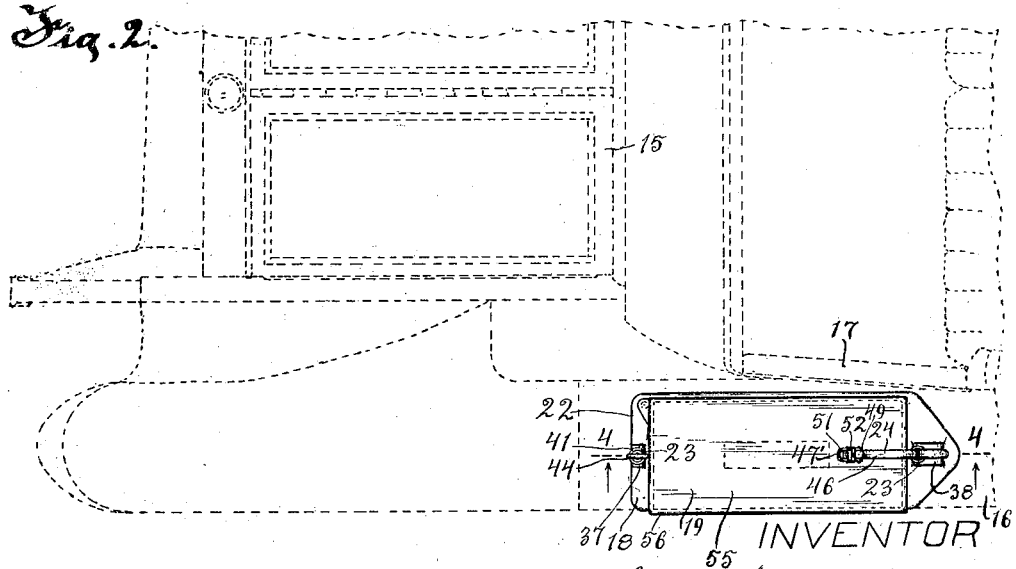
INVENTOR  
George Henry Wheary  
By Morsell, Keeney & French  
ATTORNEYS

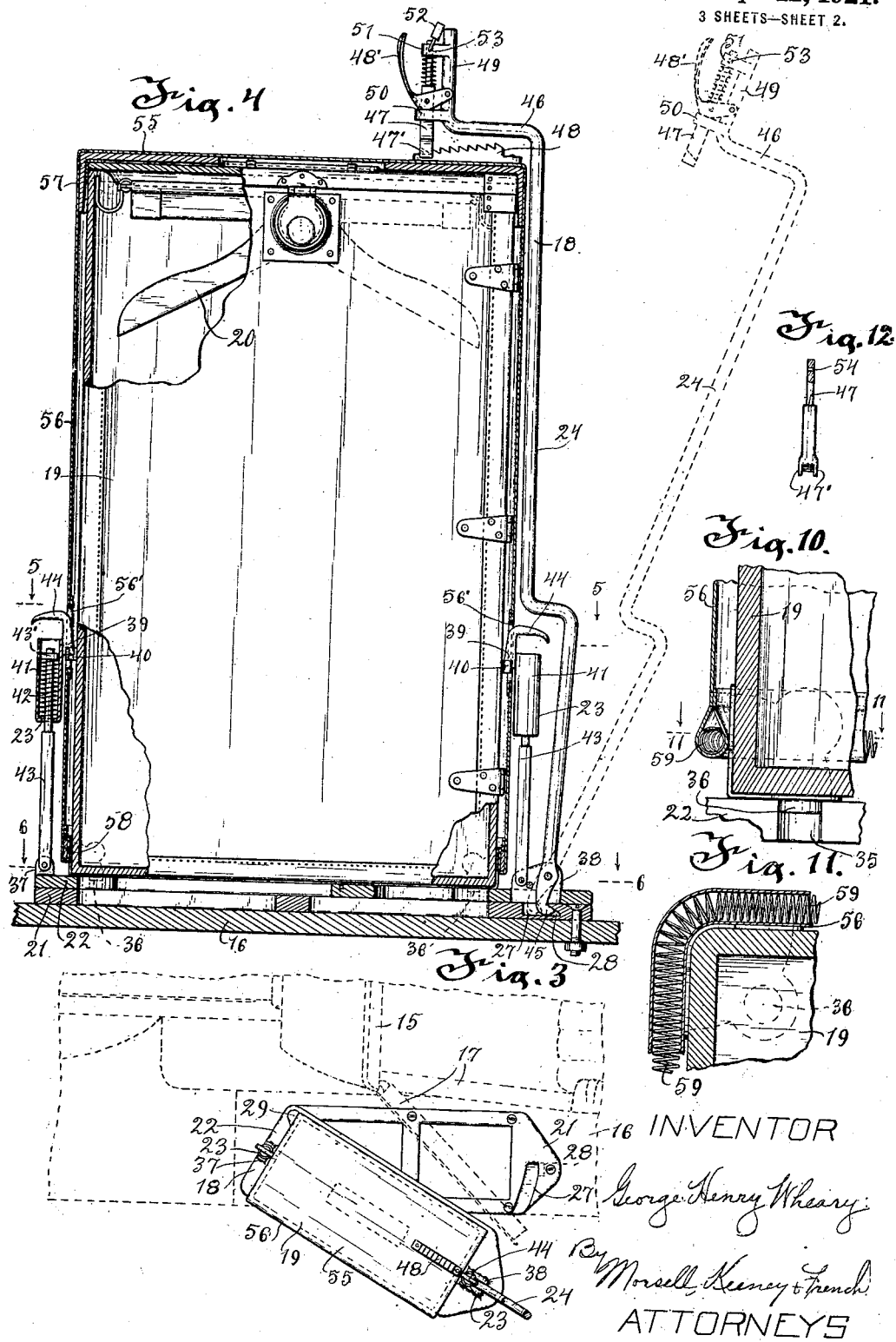

G. H. WHEARY.
AUTOMOBILE TRUNK HOLDER.
APPLICATION FILED NOV. 11, 1916.

1,374,618.

Patented Apr. 12, 1921.
3 SHEETS—SHEET 3.

INVENTOR
George Henry Wheary
BY Morsell, Keeney & French
ATTORNEYS

UNITED STATES PATENT OFFICE.

GEORGE HENRY WHEARY, OF RACINE, WISCONSIN.

AUTOMOBILE TRUNK-HOLDER.

1,374,618. Specification of Letters Patent. Patented Apr. 12, 1921.

Application filed November 11, 1916. Serial No. 130,709.

*To all whom it may concern:*

Be it known that I, GEORGE HENRY WHEARY, a citizen of the United States, and resident of Racine, in the county of Racine and State of Wisconsin, have invented new and useful Improvements in Automobile Trunk-Holders, of which the following is a description, reference being had to the accompanying drawings, which are a part of this specification.

This invention relates to improvements in automobile trunk holders.

In traveling in an automobile it is very desirable to carry a trunk and more particularly a trunk of the wardrobe type so that garments and other wearing apparel will be preserved in an unwrinkled and wearable condition and furthermore kept in such a position as to be easily accessible or the trunk easily removable when it is desired to stop at a hotel or other place of abode. Heretofore it has been the custom to provide a small platform attached to the rear end portion of the automobile and upon which platform an ordinary trunk in inclined position is strapped. This arrangement has been found very unsatisfactory due to the difficulty and time required to fasten the trunk in position and furthermore by holding the trunk and the apparel therein in horizontal position the garments were necessarily piled one on top of another and consequently soon become wrinkled and would require pressing before being suitable for wear. Also the ordinary trunk is too heavy for convenient handling and is not water nor dust-proof and the apparel soon becomes soiled while in the trunk.

It is one of the objects of the present invention to overcome the before mentioned objectionable features and provide an automobile trunk holder which will firmly hold a trunk upon the running board of an automobile without interfering with the opening of the doors of said automobile.

A further object of the invention is to provide an automobile trunk holder in which the trunk may be easily swung at an angle to the automobile running board to permit the opening of the automobile doors.

A further object of the invention is to provide an automobile trunk holder in which the trunk is covered and protected from dust and rain.

A further object of the invention is to provide an automobile trunk holder in which portions of the trunk holder are easily locked in closed position and yieldingly hold the trunk in such a manner as to absorb to a large extent the shock and jars incidental to traveling over rough roads.

A further object of the invention is to provide an automobile trunk holder in which the movable portion of the holder cannot be separated from the other portion while a trunk is mounted thereon.

A further object of the invention is to provide an automobile trunk holder which is of simple construction, is strong and durable and is well adapted for the purpose described.

With the above and other objects in view the invention consists of the improved automobile trunk holder and its parts and combinations as set forth in the claims and all equivalents thereof.

In the accompanying drawings in which the same reference characters indicate the same parts in all of the views:

Figure 1 is a side view of the improved automobile trunk holder shown mounted upon the foot board of an automobile, the automobile being indicated by dotted lines;

Fig. 2 is a top view thereof;

Fig. 3 is a similar view with the movable portion of the holder and the trunk thereon shown in its outer position, one of the automobile doors being shown in open position;

Fig. 4 is a vertical sectional view thereof on a larger scale taken on line 4—4 of Fig. 2, parts of the trunk also shown in section;

Fig. 10 is a vertical sectional detail view of a modified form;

Fig. 11 is a sectional detail view taken on line 11—11 of Fig. 10; and

Fig. 12 is a detail view of the locking dog.

Figure 5:
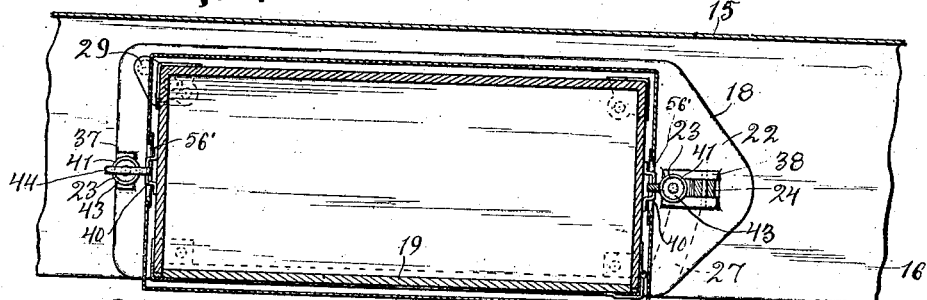
Fig. 5 is a transverse sectional view taken on line 5—5 of Fig. 4.
Figure 6:
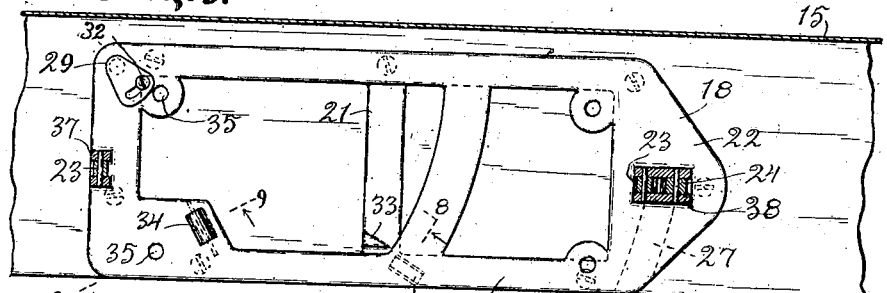
Fig. 6 is a horizontal sectional view of the holder taken on line 6—6 of Fig. 4.

Referring to the drawings the numeral 15 indicates a portion of an automobile, 16 one of the running boards, 17 one of the automobile doors and 18 the improved trunk holder mounted on the running board. A wardrobe trunk 19, having garment hangers 20 supported in its upper end portion, is shown as mounted on the holder.

The holder comprises a base member 21, adapted to be mounted fast on the running board of the automobile, a movable trunk supporting member 22 pivotally connected to the base member and trunk engaging clamping members 23 and a trunk engaging clamping and locking member 24 carried by the movable member 22. The base member 21 is approximately of rectangular form and is firmly secured to the automobile running board 16 by screws or bolts 25 which are covered by the movable member 22 when in closed position to prevent surreptitious removal. The base member 21 is provided with an antifriction roller 26 and with a curved recess 27 terminating in an undercut locking portion 28.

The movable trunk supporting member is also of approximately rectangular form and rests on and is pivotally connected to the base member 21 at its forward inner corner by a pivot bolt 29 which extends through the movable member and is threaded into the base member. The head of the bolt is in the form of a segment 30 having a concentric slot 31 for receiving a locking screw 32 which extends through the slot and threads into the movable member. The locking screw 32 is positioned to be covered by the trunk so that when a trunk is mounted on the holder it will be impossible to unscrew the pivot bolt and surreptitiously remove the trunk from the holder. The concentric slot 31 provides for adjustably locking the pivot bolt 29.

Figure 7:
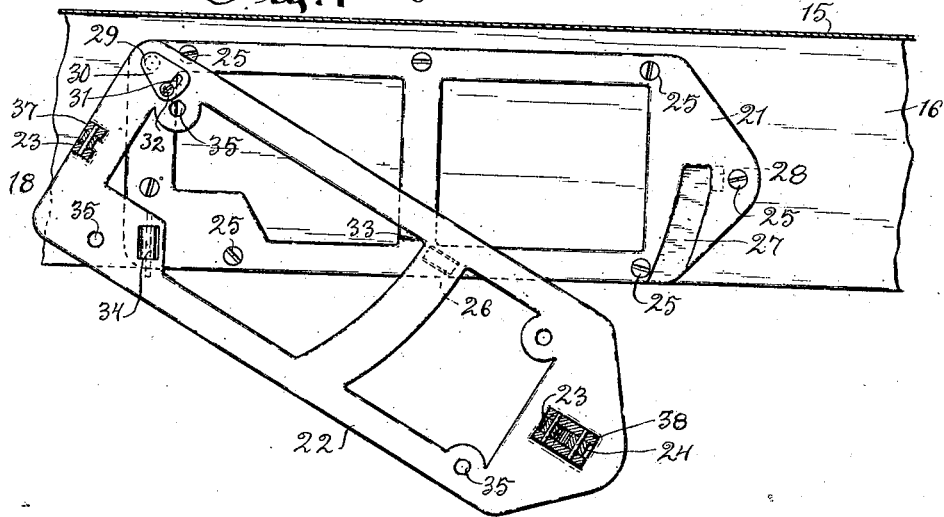
Fig. 7 is a similar view with the movable portion shown in its outer position.
Figure 9:
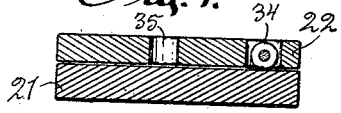
Fig. 9 is a similar view taken on line 9—9 of Fig. 6.
Figure 8:
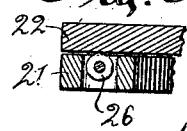
Fig. 8 is a sectional detail view taken on line 8—8 of Fig. 6.

The base member 21 is provided with an upstanding stop lug 33 which projects upwardly into one of the openings of the movable frame and into the plane of travel of the movable member to limit the outward swing of said member as shown in Fig. 7. The movable member is provided with an antifriction roller 34 which bears upon the base member.

Openings 35 formed in the movable member 22 adjacent its corner portions are adapted to receive downwardly projecting knobs 36 of the trunk 19 to maintain the lower end portion of said trunk in position on the said member.

The clamping members 23, before mentioned, are pivotally connected at their lower ends to upstanding lugs 37 and 38 forming part of the movable member and at their upper ends are provided with hook portions 39 which engage loops or straps 40 mounted on the side edge portions of the trunk 19. The hook portions of the clamping members are formed with tubular portions 41 to receive coiled springs 42 (only one being shown) and the upper ends of the pivotally connected rod portions 43 of said clamping members. The said rods extend through the coiled springs and at their upper ends are provided with heads 43' which bear against the upper ends of the springs and as the lower ends of the springs rest upon the partly closed lower ends of the tubular portions the hook portions 39 will yieldingly engage the loops or straps 40. The upper ends of said hook portions are extended outwardly to form handles 44 for convenience in engaging and disengaging the straps of the trunk. This yielding feature of the clamping members also permits sufficient yielding of the holder to absorb shocks and vibrations due to traveling over rough roads and compensates for slight variations in the height of the straps from the lower end of the trunk.

The trunk clamping and locking member 24 is also pivotally connected to the lug 38 and its lower portion 45 is of angular or hook shape to enter the locking recess 28 of the base member when in locking position. The upper portion of the locking member 24 extends upwardly alongside of the side edge of the trunk and its upper end portion 46 is bent over the upper end portion of the trunk and is provided with a spring pressed locking dog 47 which engages a locking member 48 in the form of a segmental rack. The locking dog 47 extends vertically alongside of the handle portion 49 of the member 24 and through bearing arms 50 and 51 projecting from the handle portion and is locked in rack engaging position by an ordinary padlock 52, the bow or shackle of which extends through openings 53 in the arm 51 and an opening 54 in the dog 47. Side portions 47' extend downwardly on each side of the rack and prevent lateral movement of the member 24 with relation to the trunk. A handle 48' pivotally connected to the locking dog 47 and to the handle portion 49 provides for disengaging the dog from the locking member 48.

The locking rack member 48 is mounted on the top frame 55 of the waterproof trunk cover 56 and is removable therewith when the cover is removed from the trunk. The top frame is in the form of a board having a depending rectangular flange 57 which extends around the sides of the upper end of the trunk and maintains the parts in position. The trunk cover 56 is formed of flexible waterproof material such as rubber covered cloth to permit it to be folded to occupy a small space and at its lower edge is reinforced by a rectangular shaped metal band 58 in the principal form, while in the modified form shown in Figs. 10 and 11 a coiled spring 59 is substituted for the metal band to provide a closer fit around the bottom portion of the trunk and thereby better exclude dust and moisture. Openings 56' are provided in the cover 56 to permit the engagement of the hook members 39 with the straps 40.

In use the holder is mounted on the running board and the trunk is covered and locked thereto in the manner described and when it is desired to open the door of the automobile it is only necessary to unlock the movable portion of the holder and swing the trunk mounted thereon to open position as shown in Figs. 3 and 7 and the automobile door may then be swung to open position. While the trunk holder is shown as mounted only on one side of the automobile it is to be understood that a trunk holder may be mounted on either or both sides and that one of the trunks may be of the wardrobe type and the other of the drawer type. In supporting the garments upon the hangers and maintaining the trunk in upright position the garments will not be wrinkled and will be kept in good condition to wear without the necessity of cleaning and pressing.

From the foregoing description it will be seen that the automobile trunk holder is well adapted for the purpose described.

What I claim as my invention is:

1. An automobile trunk holder, comprising a base member having means for attachment to the running board of an automobile provided with an outwardly swinging door, a trunk holding member movably connected to the base member, means for yieldingly holding a trunk in upright position on the movable member and in the path of movement of the door, said movable member and the trunk being movable to a position to permit the opening of the door, and means engaging the upper end portion of the trunk and locking the movable member in closed position.

2. An automobile trunk holder, comprising a base member having means for attachment to the running board of an automobile, a trunk holding member pivotally connected to the base member, a trunk positioned on the holding member in upright position, a top cover mounted on the trunk and provided with a lock engaging means, and an upstanding locking member carried by the holding member and lockingly engaging the lock engaging means of the cover and the base member.

3. An automobile trunk holder, comprising a trunk holding member, means for swingingly connecting said member to the running board of an automobile, a trunk cover extending over the holding member and provided with a locking member, a lever member pivoted to the holding member and extending over the cover and having means engaging the locking member thereof, said lever member also locking the holding member in closed position, and clamping members connected to the holding member and extending upwardly on opposite sides of the cover and adapted to engage a trunk mounted on the holder.

4. An automobile trunk holder and trunk, comprising a holding member having means for engaging the lower end portion of a trunk, means for swingingly connecting the holding member to a support, a trunk mounted in upright position upon the holding member and provided with connecting portions, a trunk cover member positioned on top of the trunk, clamping members engaging the holding member and the connecting portions of the trunk, and an upstanding member carried by the holding member and engaging the trunk cover member for locking the holding member against a swinging movement and locking the trunk to the holding member.

5. An automobile trunk holder and trunk, comprising a base member having means for attachment to the running board of an automobile, a trunk holding member swingingly connected to the base member, a trunk mounted in upright position upon the holding member and having straps on its opposite sides, hook members carried by the holding member and yieldingly engaging the straps, a trunk top member mounted on the upper end of the trunk, and a locking member carried by the holding member and having a locking engagement with the trunk top member and with the base member.

6. An automobile trunk holder and trunk, comprising a base member having means for attachment to the running board of an automobile, a trunk holding member swingingly connected to the base member, a trunk mounted in upright position upon the holding member and having straps on its opposite sides, hook members carried by the holding member and yieldingly engaging the straps, a trunk top member mounted on the upper end of the trunk, and a rod pivotally connected to the holding member and having a locking portion at its lower end which lockingly engages the base member and having a locking dog at its upper end which engages the trunk top member.

7. An automobile trunk holder and trunk, comprising a base member having means for attachment to the running board of an automobile and also having a locking recess, a trunk holding member swingingly connected to the base member, a trunk mounted in upright position upon the holding member and having straps on its opposite sides, yielding hook members pivotally connected to the holding member and engaging the straps, a trunk cover extending over the trunk and having a rack on its upper portion, and a rod pivotally connected to the holding member and having a locking portion at its lower end which enters the locking recess of the base member and having a locking dog at its upper end which engages the rack of the trunk cover.

In testimony whereof, I affix my signature.

GEORGE HENRY WHEARY.